① United States Patent  
Kamppari

(10) Patent No.: US 7,610,297 B2  
(45) Date of Patent: Oct. 27, 2009

(54) METHOD TO AUTOMATE RESOURCE MANAGEMENT IN COMPUTER APPLICATIONS

(75) Inventor: Olavi A. Kamppari, Lower Gwynedd, PA (US)

(73) Assignee: Honeywell International Inc., Morristown, NJ (US)

( * ) Notice: Subject to any disclaimer, the term of this patent is extended or adjusted under 35 U.S.C. 154(b) by 432 days.

(21) Appl. No.: 11/043,668

(22) Filed: Jan. 25, 2005

(65) Prior Publication Data

US 2006/0167831 A1 Jul. 27, 2006

(51) Int. Cl.
G06F 17/30 (2006.01)

(52) U.S. Cl. .................... 707/101; 717/120; 715/744

(58) Field of Classification Search ............... 707/101; 717/120; 715/744
See application file for complete search history.

(56) References Cited

U.S. PATENT DOCUMENTS

| 5,421,015 | A | * | 5/1995 | Khoyi et al. ............... 718/107 |
| 5,434,776 | A |   | 7/1995 | Jain |
| 5,652,884 | A |   | 7/1997 | Palevich |
| 5,878,425 | A |   | 3/1999 | Redpath |
| 5,960,421 | A |   | 9/1999 | Cline et al. |
| 7,313,587 | B1 | * | 12/2007 | Dharmarajan ............... 709/201 |
| 7,516,442 | B2 | * | 4/2009 | Wu et al. .................. 717/120 |
| 2002/0162090 | A1 | * | 10/2002 | Parnell et al. ............... 717/120 |
| 2003/0084401 | A1 | * | 5/2003 | Abel et al. ................. 715/501.1 |
| 2003/0110469 | A1 | * | 6/2003 | Jackson ...................... 717/113 |
| 2003/0126310 | A1 | * | 7/2003 | Ryzhov ....................... 709/328 |
| 2004/0155896 | A1 | * | 8/2004 | Miller et al. ................ 345/700 |
| 2004/0186857 | A1 | * | 9/2004 | Serlet et al. ................ 707/200 |
| 2004/0261054 | A1 | * | 12/2004 | Colling ....................... 717/106 |
| 2005/0009538 | A1 | * | 1/2005 | MacKay et al. .......... 455/456.3 |
| 2005/0066315 | A1 | * | 3/2005 | Nguyen et al. ............. 717/136 |
| 2006/0004836 | A1 | * | 1/2006 | Dhingra ..................... 707/102 |
| 2006/0106800 | A1 | * | 5/2006 | Ollikainen et al. ........... 707/9 |

FOREIGN PATENT DOCUMENTS

WO   WO 01/95104 A1   12/2001

\* cited by examiner

*Primary Examiner*—Charles Rones  
*Assistant Examiner*—Phuong-Thao Cao  
(74) *Attorney, Agent, or Firm*—Ohlandt, Greeley, Ruggiero & Perle, L.L.P.

(57) ABSTRACT

There is provided a computer comprising an application that generates a call having a resource name and a default value. A resource manager compares an entry in a localized resource file to the resource name. A resource manager wrapper adds said resource name to a resource file if the localized resource file does not contain the resource name. The resource manager wrapper then sends a return value to the application to be used with presentations to an end user.

21 Claims, 3 Drawing Sheets

METHOD TO AUTOMATE RESOURCE MANAGEMENT IN COMPUTER APPLICATIONS

BACKGROUND OF THE INVENTION

1. Field of the Invention

The present disclosure relates to computer systems, and more particularly, to translating commands from a first human language to a second human language.

2. Description of the Related Art

In conventional technologies, computers use resource files. A resource generally corresponds to a pre-defined approach to a presentation of information, such as a typeface, computer icon, or a pre-defined format. Resource files are a way of enabling an application, based on resource definitions defined within the resource files, to tailor the appearance of an application without modifications in the application code. A resource could be, for example, a drop-down menu. The resource name that can be used to identify the resource could be "menu."

The resource can have a corresponding index number. In some prior art systems, a resource file would contain an index number, but not the resource name itself. Instead, the index number corresponds to a given resource and hence, resource name. For instance, a resource name of "total amount" could have an index number of 35, and the resource name for a label of "shift" for a "shift" key could have an index number of 36.

Furthermore, each index has its own associated value as defined within the resource file. A value can be generally defined as a string or command that is used by a resource. For instance, in the coding of an application, whenever the index number "35" is used in an application, the application could then substitute the value (or string) "total amount." However, "total amount" could have a value of "total amount" and the resource name of shift key could have a value of "shift."

However, the use of indexes creates problems when trying to adapt an application for speakers other than English, as English is typically the source code computer language of choice. For instance, if one is trying to program a French interface, how does one translate, within a source file, the term "35" into a corresponding French value that is appropriate to a speaker of French? There are several approaches, each having its own disadvantages.

For instance, if words are indexed within a single source file for all languages, index numbers could run out. For instance, assume 1000 is used as a base address for English resources and 2000 for French resources, and the index increments by the count of one. Therefore, slots 1-1000 are for English, and slots 1001 to 2000 are for French. If there are more than 1000 resources of interest, then the source file can not contain a new resource, as either English or French resources can only have one thousand resources defined a piece.

A localized resource file can be generally defined as a resource file having values that correspond to local conditions, such as languages or cultures. If, instead of a base address within a single source file, the application has been programmed to access a selected one of a series of separate localized resource files as a function of a local language and culture, oftentimes there are discrepancies between the English meaning of the word and the foreign translation. For instance, for the index 36 (shift resource), index 36 could refer to a shift key, or alternatively to a group of employees working during a time period in a factory. Each meaning of the resource name "shift" would have a different translation as entered into the value within the localized resource file.

Therefore, in the prior art, instead of calling for an index number in an application, a resource name was called for instead. For instance, the resource name of "total.value" could be called for within an application. The resource file would then be used for defining what the corresponding value would be for the resource name. Then, the corresponding value could be defined as the English string "total value." However, the corresponding value could instead be "kokonaismäärä" in Finnish, or it could be some other value in a foreign language. The use of resource names, however, made it somewhat easier for foreign translators to keep up with what is meant by an English term, as opposed to index numbers.

However, if a resource name was requested by an end user that was not defined within the selected resource file, the application would often hang up, crash, abort, or otherwise behave in an undesirable manner. Furthermore, for some kinds of applications, such as data driven applications, where customer independent code is developed in a generic way and all customer data is stored in application databases, the possibility of crashing is especially prevalent.

Furthermore, in certain applications, the name that a resource will be given, such as a name of a sensor used in a generic sensor display, is unknown during the time of writing the application. For instance, if a sensor named "moisture" is added to an application database, and the resource name of "moisture" is not defined within a resource file, the system would behave in an undesirable manner if the application tried to access the resource name "moisture".

This is further exacerbated by resources that have resource names other than English. For instance, a resource is added to a system with a resource name of "lämpötila". However, perhaps lämpötila is not defined in the resource file. This can be especially difficult when trying to develop culturally equivalent analogues for corresponding values for resource names, as it may be difficult to discover what is meant by this resource name.

Furthermore, having to manually (i.e., not in real-time, and by a developer) update resource files is a problem. Part of the problem is that there can be spelling mistakes when the resource names are entered independently in application code and in the resource file. In data driven applications especially, another part of the problem is that the number of required resource names could be increased after the application is already released. However, there may be no quick and convenient way to add these resource names to the resource file.

To support context sensitive translations of phrases and homonyms, there is a need for an application to identify the context, such as display name or application form, (in other words, the value), to be used in the translations. In a localization process for generating values for a local language that correspond to a resource name, the translations of the same phrases and homonyms should be available for parallel processing to reduce the localization effort and to improve the consistency of the translations. Therefore, there is a need for resource file management and localized resource file management.

SUMMARY OF THE INVENTION

There is provided a computer system. An application generates a call having a resource name and a default value. A resource manager compares an entry in a first resource file to the resource name. A resource manager wrapper writes the resource name to a second resource file if the first resource file does not contain the resource name. The resource manager wrapper transmits a return value associated with said resource name to the application. An interface presents information as a function of said return value. The return value is the default value if said resource name was not found in said first resource file. The return value is a localization value read from the first resource file if the resource name was found in the first resource file. A database provides the resource name and a default value to the application. The call comprises an Application Programming Interface (API) call. The default value corresponds to a first human language. The first human language is selected from the group consisting of: English, Spanish, Finnish, Mandarin Chinese, and German. A localization tool generates a localization value. The localization value corresponds to a second human language. The localization tool inputs said localization value into said first resource file. The first resource file is a localized file. There is provided a method. A call is received that t has an associated resource name and an associated default value. It is determined if the resource name is defined in a first resource file. If the resource name is defined in the first resource file, a corresponding resource value from said first resource file is then retrieved. If the resource name is not defined in said localized file, the resource name is written in a second resource file. The default value is written as a value associated with said resource name in the second resource file. A return value associated with said resource name is transmitted. The return value is the default value if said resource name was not found in said first resource file. The return value is a localization value read from the first resource file if the resource name was found in said first resource file. The default value corresponds to a first human language. The first human language corresponds to developer's language. The localization value corresponds to a second human language. The second human language corresponds to a user's language. The call is an API call. The resource name is a dynamic resource name.

There is provided a. computer storage medium. A call is received that has an associated resource name and an associated default value. It is determined if the resource name is defined in a first resource file. If the resource name is defined in the first resource file, a corresponding resource value is retrieved from the first resource file. If the resource name is not defined in the first resource file, the resource name is written in a second resource file, and writing the default value as a corresponding default value for the resource name in the second resource file.

DESCRIPTION OF THE INVENTION

The term "module" is used herein to demarcate a functional operation that may be embodied either as a stand-alone component or as one of a plurality of components in an integrated assembly.

Figure 1:
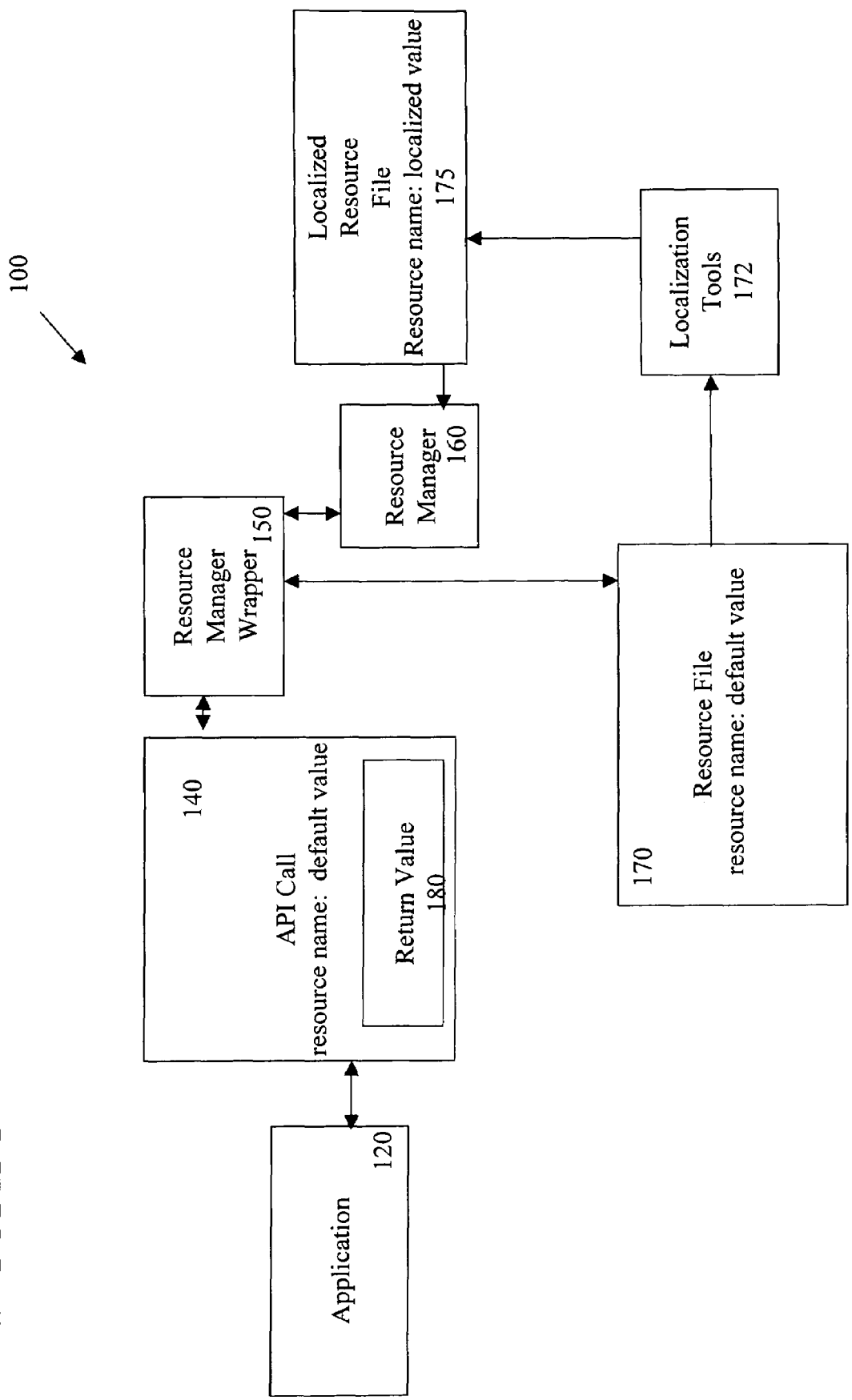
FIG. 1 is illustrates a software system for generating a return value for an interface.

In FIG. 1 schematically illustrates a computer software system ("system") 100. System 100 has an application 120. Application 120 accesses an associated customer database, results of which are displayed on a user interface, although system 100 is illustrated as software modules.

In system 100, static resource names, that is, the non-localized names which do not differentiate among different language formats, etc., are embedded in the source code of application 120. The associated customer database has stored within dynamic resource names for use with localized presentations on the user interface and static resource names. A dynamic resource name may be defined as those resource names that are not known at the time when application 120 was created. Dynamic resource names can from the customer database or another similar external source. A static resource name may be generally defined as a resource name known by the programmers at the time when application 120 was created. Although static definitions can be handled in a resource file, because static names they are defined during application 120 development time, a dynamic resource name, appropriate to present data or graphics over the user interface to an end user, also should be presented.

A user interface requests a resource to enable it to display or present an item of interest. Application 120 can get either a dynamic resource name from the customer database or a static resource name from the source code of application 120, or both. Although both the static and dynamic resource names are defined inside the end-user database or application 120, the resource name, such as a dynamic name, might not be updated within a resource file. However, the resource, either dynamic or static, should be put in a cultural or linguistic format that is appropriate to the user interface.

Therefore, application 120 generates an Application Programming Interface (API) call 140 to determine if there is a more appropriate value to be used for presentation of the resource to user interface 130. API call 140 originates from application 120, and invokes a resource manager wrapper 150, as indicated by double-arrows connecting API call 140 and resource manager wrapper 150. Resource manager wrapper 150 can be generally defined as a module, program or script that makes possible the running of a resource manager 160, as will be described below.

API call 140 also has a return value 180. Return value 180 is the value that is used in when presenting a resource through the user interface. For instance, if resource name is "total.value," and the return value is "kokonaismäärä," this is the value that will be used when presenting the resource name corresponding to "total.value" on the user interface.

The default value of API call 140 is used for two purposes. First, the default value is copied into return value 180 by resource manager wrapper 150 in cases where the resource name was not found in a localized resource file 175. For instance, if the resource name were "poisonous liquid", the default value within API call 140 could be a color of "day-glow green". Therefore, "day-glow green" is the value that will be used to select a color in the user interface in the absence of a localized value with a localized resource file 175. Second, the default value of API call 140 is recorded in a resource file 170 together with the resource name of API call 140 if the resource name was not previously recorded in resource file 170.

Resource manager wrapper 150 receives information from API call 140. Resource manager wrapper 150 can be a class and API call 140 can be a method in a class according to object oriented programming. Resource manager 160 queries localized resource file 175 as to whether the resource name is defined within localized resource file 175. Resource manager 160 can be generally defined as a module, script or code that sorts, indexes, organizes, and can carry out access requests to localized resource file 175. Generally, localized resource file 175 contains various resource names and localized (i.e. non-default) values corresponding to the resource names. The manner of entering non-default names into localized resource file 175 will be discussed below.

If localized resource file 175 has the resource name stored within it, localized resource file 175 will so indicate to the resource manager 160. Furthermore, localized resource file 175 will convey the associated localization value back to resource manager 160.

However, if the resource name is not found within localized resource file 175, resource manager wrapper 150 writes the resource name and the received default value into resource file 170. In other words, system 100 can dynamically update its resource file 170. For instance, if localized resource file 175 does not have the resource name of "stress overload," resource manager wrapper 150 writes the resource name "stress overload," to resource file 170. Furthermore, resource manager wrapper writes the corresponding default value into resource file 170.

Writing values to resource file 170 helps avoid computer crashes because resource file 170 is used to collect the resource names and default values that are not yet localized. The automatic saving of resource names covers both the static resource names embedded in application 120 code and the dynamic names embedded in the customer database or in the external world that the customer database represents. The likelihood of a crash occurring is reduced by sending return value 180 to application 120. A misspelling in the resource name is corrected through automating the resource name collection.

An example of the external world is an English alarm message coming from a third party vendor system. By capturing the alarm message in resource file 170, it can be translated into local language in localized resource file 175, and then used in a presentation on the user interface. However, the default values can not go directly from resource file 170 to localized resource file 175. Human intervention is required to do the actual translations and other localization acts.

Resource file 170 can be viewed with the aid of a localization tool 172, and contents can be copied, altered and stored in localized resource file 175. With the aid of localization tool 172, it can be determined by an operator or a programmer that a resource name within resource file 170 has an inappropriate corresponding default value, as received from API call 140, and that the resource name should have a corresponding value that is more correct in the translated language to the end user of the user interface.

Localization tool 172 copies the resource name and the default value from resource file 170. Localization tool 172 is then used to generate an appropriate localization value to correspond to the resource name. Generally, the localization value is a value that is used for presenting the resource in user interface 130 in a culturally and linguistically appropriate manner. For instance, for the resource name of "poisonous liquid", instead of a default value of "day-glow green," the corresponding localized value of "burnt umber" could be generated. The localization value and the resource value are then stored in localized resource 175. In other words, resource file 170 is used to only capture those resources that are not yet included in localized resource file 175.

The localized resource files within localized resources 175 can be organized by two criteria: 1) by language and 2) by application area. The language can be specific for a culture, geographical area, or local practice. The application area can be part of an application, specific for an application, or shared by multiple applications. An application area can be generally defined as an application having independent parts, such as displays or reports. A computer can support substantially independent applications that need to share the same translations. The choice of languages/cultures can be independent of the application areas.

If there was no resource name defined within localized resources 175, then the default value from API call 140 becomes return value 180. If there was a resource found in localized resource file 175, the corresponding localization value becomes return value 180. API call 140 then returns resource name and return value 180 to application 120. Application 120 interprets returned value 180 and employs it in user interface 130 for presentations to the end user.

Localization tool 172 is used to generate a localization value for storage within localized resource file 175. For instance, in localized resource file 175 created for Finnish speakers, localization tool 172 writes the resource name "stress overload" with a corresponding localized value of "ylipaine" (Finnish for "stress overload"). Before the Finnish localized value of the resource name is written to localized resource file 175, user interface 130 will show the default value string "stress overload". This value of "stress overload" would be return value 180. After the Finnish translations are available in localized resource file 175 for Finnish speakers as a localized value, return value 180 of "ylipaine" will be shown in the user interface 130. Alternative languages for use within localized resource 175 can be, for instance, English, Spanish, Finnish, Mandarin Chinese, or German. The values are not restricted to words, phrases, and text, but can be used for all culture and language specific user interface items, such as colors, icons, pictures, audio, and video. In this example the resource name "stress overload" was also used as the "default value" in the application code.

Within localized resource file 175, there is a hierarchical structure for the languages and geographical areas. The hierarchical structure for geographical areas is a practical way to reduce the translation effort to support the same language on similar environments. This is a concept supported by resource manager 160, such as the Microsoft Resource manager.

For example, there can be translations for German in general and German spoken in Switzerland specifically. If the specific Swiss dialect of German is not found within localized resource file 175, the generic German translation is used. If the German translation is missing, the default value specified in application 120 is used.

When application 120 generates API call 140, it does its initialization corresponding to application area and the target language and/or cultural area of use are indicated. The language can be changed, say from English to Finnish, after the initialization of API call 140 to support immediate language changes without restarting the application 120. This would occur through selecting different files within localized resource file 175, each file having the appropriate localized values for individual languages.

Application 120 can use API call 140 by indicating the target language during initialization. In that case the language selection is static. If the language is not indicated, then the language currently selected in the operating system or application management is used. Resource manager wrapper 150 can detect the language change in the operating system or application management. After the change, resource manager wrapper 150 will explicitly change the language selection in resource manager 160. With this feature, a developer of application 120 does not need to write any code to support a dynamic language changes.

Figure 2:
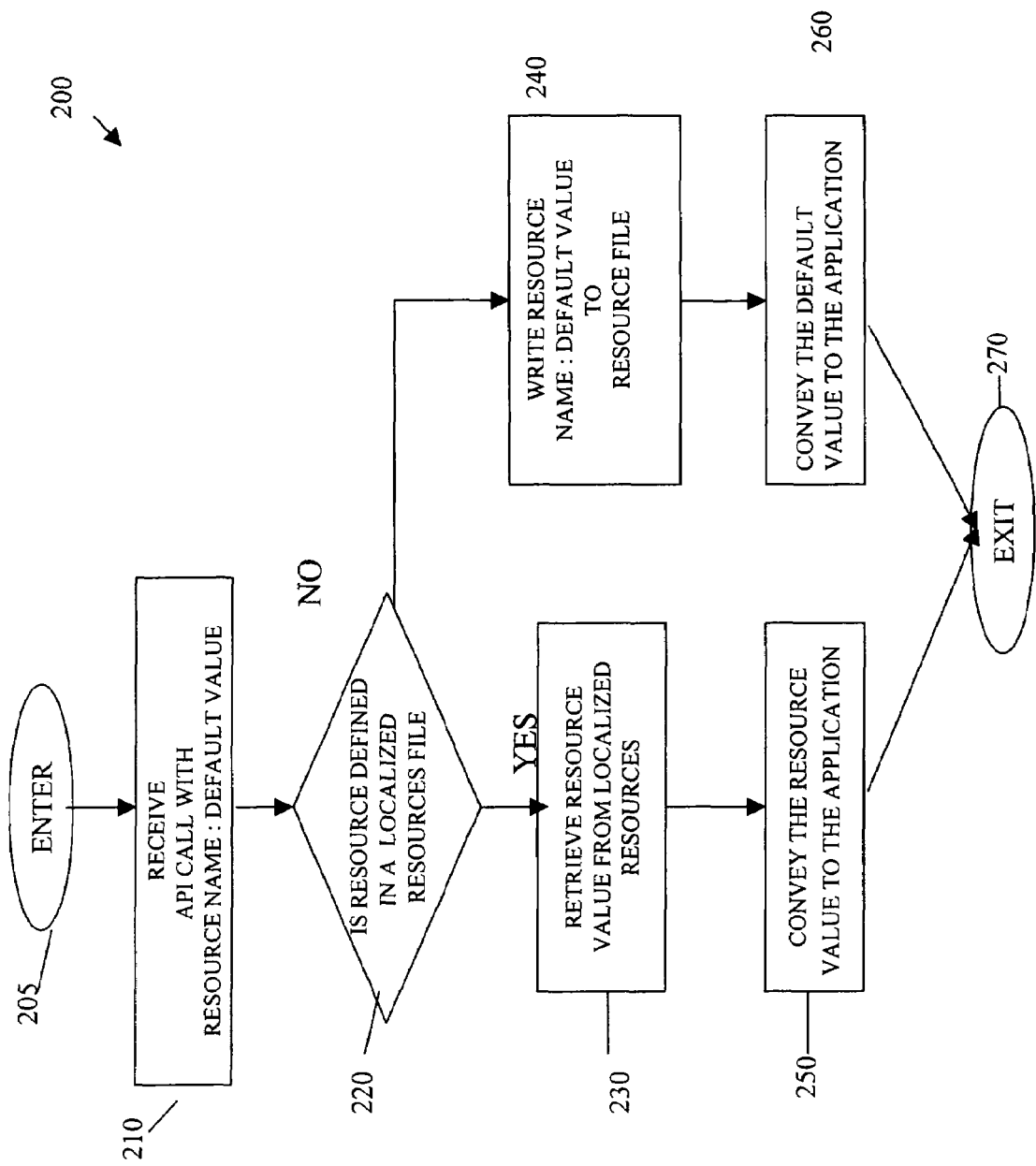
FIG. 2 illustrates a method for dynamically updating a resource file.

FIG. 2 illustrates a flow chart 200 for using and updating a resource file. After an enter step 205, in step 210, resource manager wrapper 150 is activated by API call 140. API call 140 has a resource name and corresponding default value. In step 220, it is determined whether the resource name is defined within localized resource file 175. If it is, then the corresponding localized value is returned from localized resource file 175. In step 250, localized value is copied to application 120 through use of return value 180, and method 200 exits in step 270.

However, if in step 220 it is determined that the resource name is not in localized resource file 175, resource manager wrapper 150 adds the resource name and default value to resource file 170. In step 260, a copy of the default value is returned to application 120 through return value 180, and method 200 exits in step 270.

Figure 3:
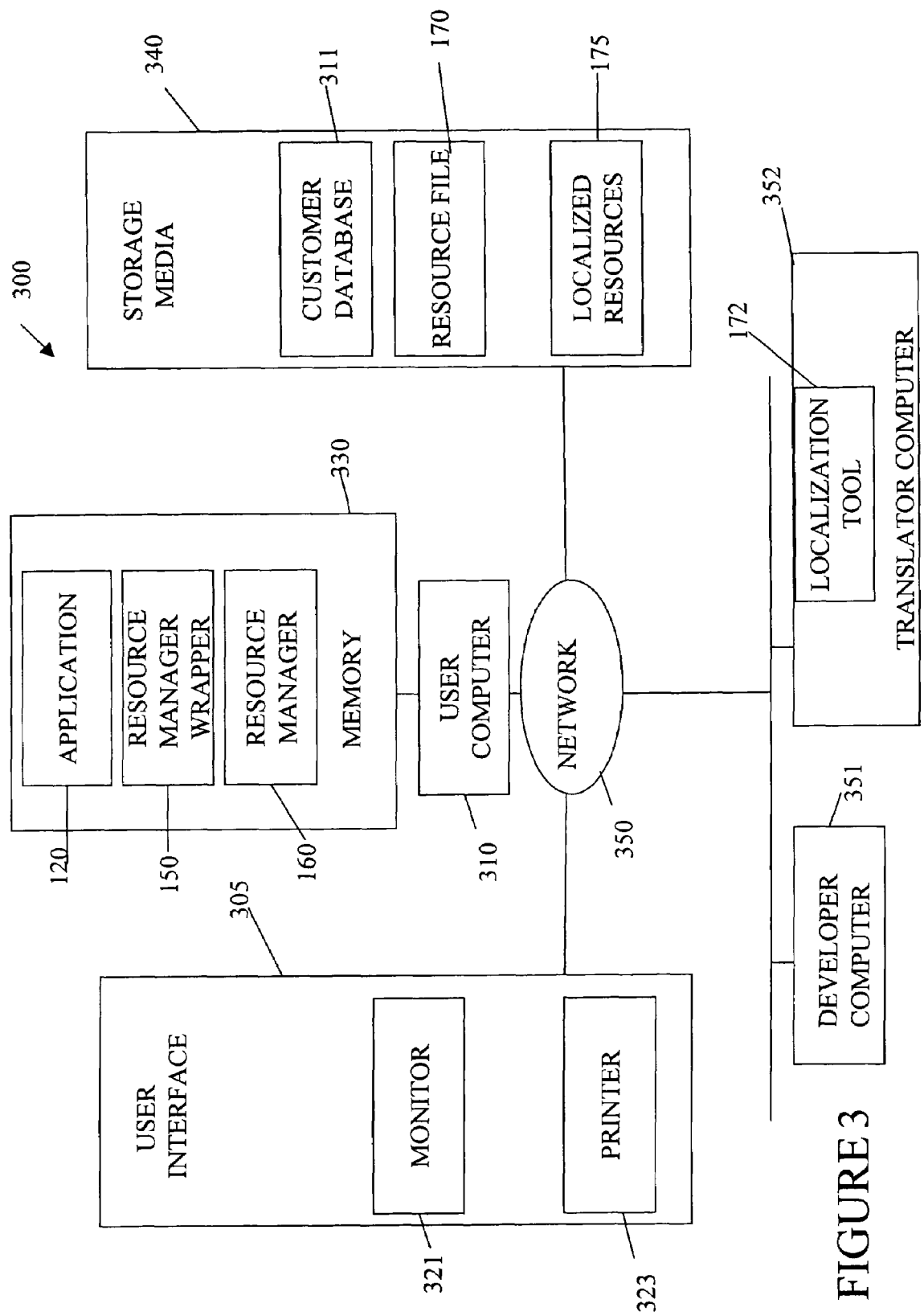
FIG. 3 illustrates a computer system for dynamically updating a resource file.

Referring to FIG. 3, illustrated herein is a block diagram of a computer system 300 adapted for dynamically updating resource file 170 according to method 200. Computer system 300 includes a user computer 310 coupled to user interface 305, a memory 330, a storage media 340, a network 350, a developer computer 351, and a translator computer 352. Memory 330 is used to run application 120 on user computer 310.

Memory 330 contains application 120, resource manager wrapper 150, and resource manager 160. Application 120, resource manager wrapper 150, and resource manager 160 were coded originally in developer computer 351. The resource names used are either embedded in the application code 120 or application 120 retrieves the resource names from customer database 110 or another external location.

The storage media 340 contains customer database 110, resource file 170, and localized resources 175. When application 120 is executed, the items in storage media 340 can be partially or completely loaded into memory 330. Customer database 110 was originally coded and had data input from developer computer 351 and can be modified and updated in user computer 310.

Application 120 uses resource manager wrapper 150 to determine if a localized value matches the resource name for a cultural context and/or selected language. Resource manager wrapper 150 uses resource manager 160 for the actual retrieval based on the information stored in localized resources 175. If the localization value is found, this value is returned to application 120 as return value 180 by resource manager 150. Return value 180 is then used by application 120 in presentations on user interface 130.

If a resource name is not specified for the selected language and cultural context in localized resource file 175, (i.e., there is no corresponding localized value for that resource name), the default value specified by API call 140 of application 120 is copied as the return value 180 and the resource name and the default value are stored in resource file 170. Return value 180 is then used by application 120 in presentations on user interface 130.

After executing the application 120 during development, testing, production, or other periods, the names of all new resources and their default values are stored in resource file 170. Then, the new resource names and default values are downloaded into a translator computer 352. Localization tool 172 is used by translator computer 352 to generate localized values for various language and cultures for the new resources that are found in resource file 170. These localized values and corresponding resource names are input into localized resource file 175 for all the languages and cultures that are used in conjunction with user interface 130. The user interface 130 shows the retrieved localized value on windows on a monitor screen 321 and on a reports printer 322 or other man-machine output devices, such as a speaker.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A computer system which comprises:
   a computer, a user interface and a memory that comprises an application, a resource manager and a resource manager wrapper;
   wherein said application in response to a request from said user interface for a presentation of an item generates a call having a resource name and a default value for a resource associated with said item;
   wherein said resource manager responds to said call by determining if said resource name is defined in a first localized resource file;
   wherein said resource manager wrapper writes said resource name in a second resource file, and automatically writes said default value as a value associated with said resource name in said second resource file, if said first localized resource file does not contain said resource name, or said resource manager retrieves a corresponding resource value from said first localized resource file if said first localized resource file contains said resource name, and provides a return value associated with said resource name to said application for use in providing data to said user interface for said presentation; and
   wherein said resource name is a dynamic resource name, and wherein said first localized file contains only static resource names and localization values and said second resource file contains dynamic resource names and default values that are not localized.

2. The computer system of claim 1, further comprising an interface that presents information as a function of said return value.

3. The computer system of claim 1, wherein said return value is said default value if said resource name was not found in said first localized resource file.

4. The computer system of claim 2, wherein said return value is a localization value read from said first localized resource file if said resource name was found in said first localized resource file.

5. The computer system of claim 1, further comprising a database that provides said resource name and a default value to said application.

6. The computer system of claim 5, wherein said call comprises an Application Programming Interface (API) call.

7. The computer system of claim 1, wherein said default value corresponds to a first human language.

8. The computer system of claim 7, wherein said first human language is selected from the group consisting of: English, Spanish, Finnish, Mandarin Chinese, and German.

9. The computer system of claim 1, further comprising a localization tool that updates the resource names of said first localized resource file with the resource names written to said second resource file.

10. The computer system of claim 9, wherein said localization tool generates localization values for said resource names written to said second resource file.

11. The computer system of claim 10, wherein said localization tool inputs said localization values into said first localized resource file.

12. A method of operating a computer that comprises a user interface and a memory that contains an application, a resource manager and a resource manager wrapper, said method comprising:

in response to a request from said user interface for presentation of an item, generating from said application running on said computer a call that has an associated resource name and an associated default value;

in response to said call, said resource manager determines if said resource name is defined in a first localized resource file;

if said resource name is defined in said first localized resource file, then said resource manager retrieves a corresponding resource value from said first localized resource file;

if said resource name is not defined in said first localized file, then said resource manager wrapper writes said resource name in a second resource file, and automatically writes said default value as a value associated with said resource name in said second resource file; and providing a return value associated with said resource name for use in said presentation of said item by said user interface, wherein said return value comprises said resource value or said default value, and wherein said resource name is a dynamic resource name, and wherein said first localized file contains only static resource names and localization values and said second resource file contains dynamic resource names and default values that are not localized.

13. The method of claim 12, further comprising transmitting said return value to said application.

14. The method of claim 13, wherein said return value is said default value if said resource name was not found in said first localized resource file.

15. The method of claim 13, wherein said return value is a localization value read from said first localized resource file if said resource name was found in said first localized resource file.

16. The method of claim 12, wherein said default value corresponds to a first human language.

17. The method of claim 16, wherein said first human language corresponds to a developer's language.

18. The method of claim 15, wherein said localization value corresponds to a second human language.

19. The method of claim 18, wherein said second human language corresponds to a user's language.

20. The method of claim 12, wherein said call is an API call.

21. A computer storage medium that stores a plurality of instructions of a computer program comprising:

one or more said instructions for operating a computer to receive a call that has an associated resource name and an associated default value;

one or more said instructions for operating said computer in response to said call to determine if said resource name is defined in a first localized resource file;

if said resource name is defined in said first localized resource file, one or more instructions for operating said computer to retrieve a corresponding resource value from said first localized resource file;

if said resource name is not defined in said first localized resource file, one or more of said instructions for operating said computer to automatically write said resource name in a second resource file and to write said default value as a corresponding default value for said resource name in said second resource file; and providing a return value associated with said resource name for use in said presentation of said item by said user interface, wherein said return value comprises said resource value or said default value, wherein said resource name is a dynamic resource name, and wherein said first localized file contains only static resource names and localization values and said second resource file contains dynamic resource names and default values that are not localized.

* * * * *